(12) United States Patent
Wang

(10) Patent No.: US 6,186,624 B1
(45) Date of Patent: Feb. 13, 2001

(54) DECORATIVE EYEGLASSES FRAME

(76) Inventor: Yih-Fa Wang, No. 16, Kuo Tai Lane, Section 2, Chiang Ping Road, Taichung (TW)

(*) Notice: Under 35 U.S.C. 154(b), the term of this patent shall be extended for 0 days.

(21) Appl. No.: 09/585,356

(22) Filed: Jun. 2, 2000

Related U.S. Application Data

(63) Continuation-in-part of application No. 09/395,966, filed on Sep. 14, 1999.

(51) Int. Cl.$^7$ ..................................................... G02C 5/00
(52) U.S. Cl. .............................. 351/140; 351/41; 351/51
(58) Field of Search .................................. 351/41, 44, 51, 351/154, 140, 83, 86

(56) References Cited

U.S. PATENT DOCUMENTS 3,542,460 * 11/1970 Smith et al. ........................ 351/52

* cited by examiner

*Primary Examiner*—Huy Mai
(74) *Attorney, Agent, or Firm*—Rosenberg, Klein & Lee

(57) ABSTRACT

A decorative eyeglasses fame includes a front composed of a first part and a second part between which a lens member is clamped, and two temples respectively connected to the second part. The second part has two connection blocks on two ends thereof and the lens member has two recesses in two ends so that the two connection blocks are engaged with the two recesses of the lens member. The two parts of the front and the two temples are made of foam material so that different shapes and colors can be conveniently made.

2 Claims, 3 Drawing Sheets

DECORATIVE EYEGLASSES FRAME

This application is a Continuation-In-Part Application (CIP) for an applicant's application Ser. No. 09/395,966 with a title of "DECORATIVE EYEGLASSES FRAME", filed on Sep. 14, 1999.

FIELD OF THE INVENTION

The decorative eyeglasses frame has a front composed of a first part and a second part between which lens are clamped, and two temples which are foldably connected to the second part of the front. The frame is made of foam material so that it may have variety of colors and less weight.

BACKGROUND OF THE INVENTION

A conventional eyeglasses frame generally includes a front and two temples which are pivotally connected the two ends of the front by two hinges and rivets. The conventional eyeglasses frame is made of plastic material so that it has a fixed shape and heavy. However, the trend of the shapes of the eyeglasses frames of youth is changing all the time so that the shapes of the plastic eyeglasses frame cannot meet the requirements of the changing need of the youth. Some decorative eyeglasses frames are developed and having various of shapes which are made by cutting from paper boards. Although the decorative eyeglasses frames are easily made and have many colors, the decorative eyeglasses frames have weak structural connection so that the temples are easily torn off from the front the frame. Therefore, the conventional decorative eyeglasses frame has less practical function and it cannot be used as a general eyeglasses frame because lenses cannot be fixed to the front of the paper-made front.

The present invention intends to provide a decorative eyeglasses frame which is made of foam material and the lenses can be clamped between the two parts of the front of the frame. The foam made frame is light in weight and can be made of many different shapes so as to meet the requirements of the modern youth.

SUMMARY OF THE INVENTION

In accordance with one aspect of the present invention, there is provided a decorative eyeglasses frame and comprises a front comprising a first part and a second part. The lens member is clamped between the first part and the second part The first part has a notch defined in two ends thereof and two connection blocks are located on a side of the second part and attached at two ends of the second part. The lens member has two recesses respectively defined in two ends thereof so that the two connection blocks are respectively engaged with the two recesses of the lens member and the two notches of the first part Two temples each have a protrusion extending from a first end thereof and the protrusion is adhered on a top of the second part.

The object of the present invention is to provide a decorative eyeglasses frame whose front is made of foam material and a lens member is clamped between two parts consisting the front. The eyeglasses frame is light in weight and can be made with variety of shapes conveniently.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
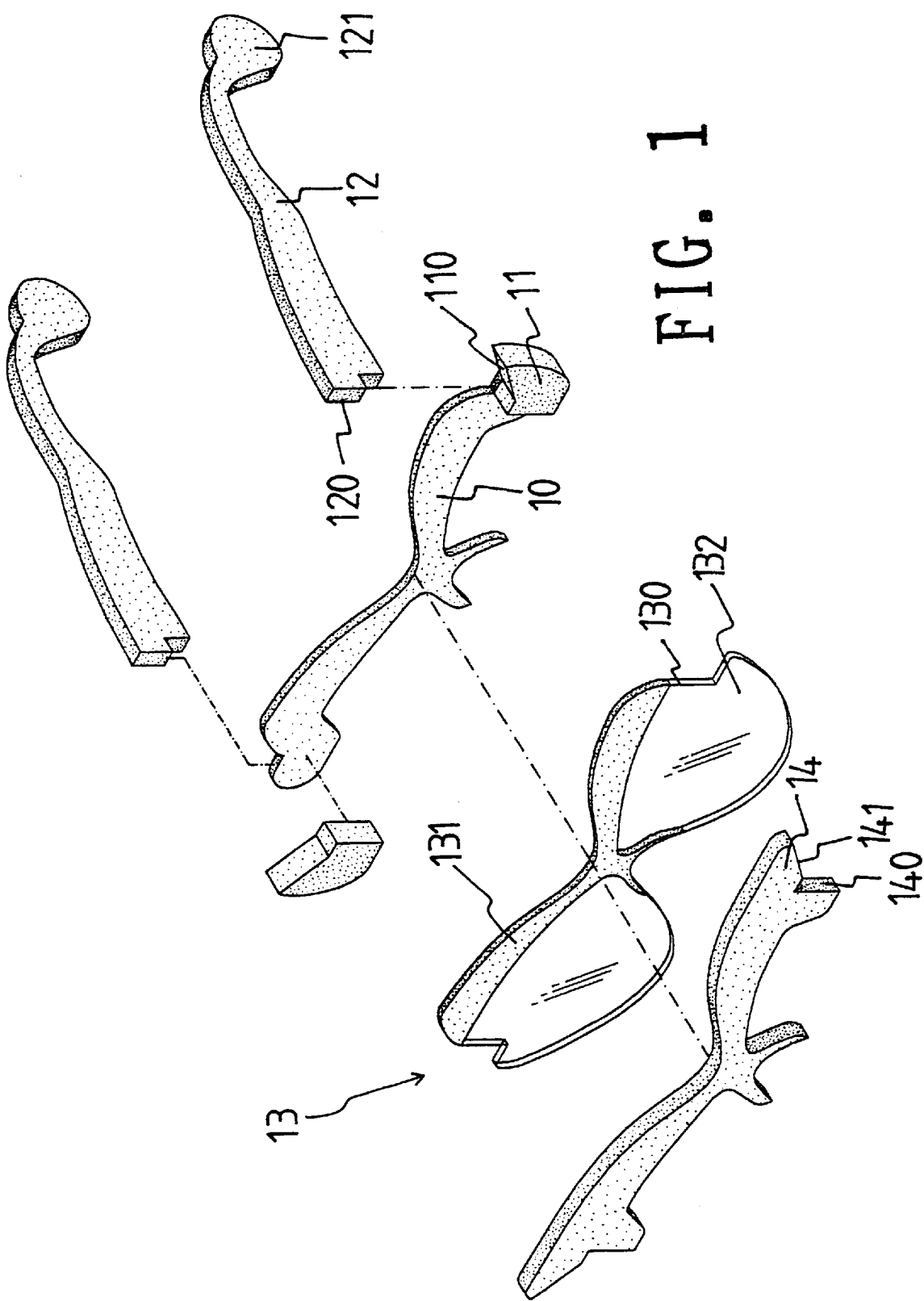
FIG. 1 is an exploded view of the decorative eyeglasses frame in accordance with the present invention.
Figure 3:
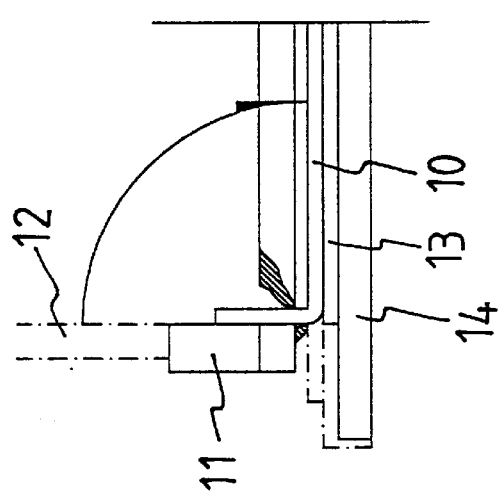
FIG. 3 is an illustrative view to show the pivotal movement of the temple on the second part.
Figure 2:
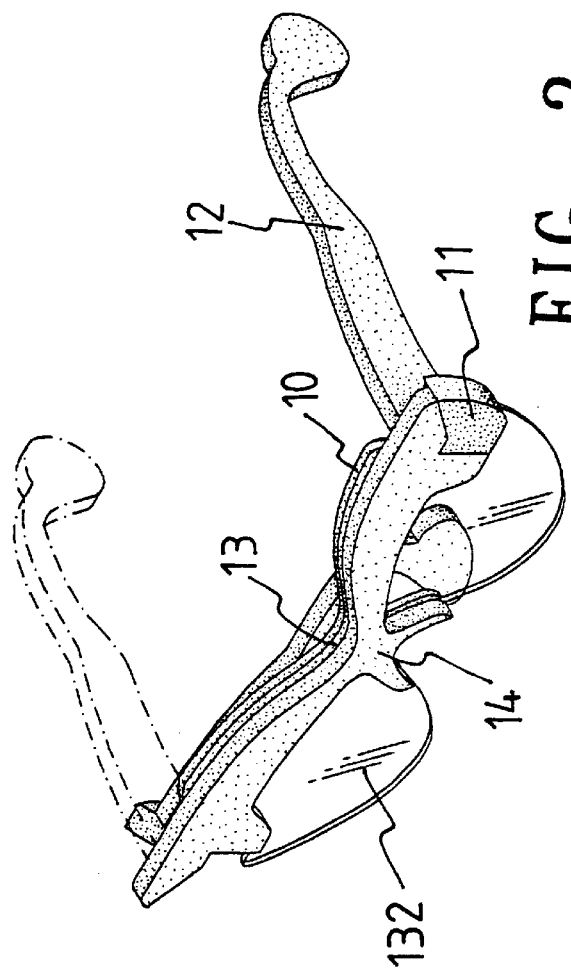
FIG. 2 is a perspective view of the decorative eyeglasses frame in accordance with the present invention, wherein on of the temples is folded toward the front.

Referring to FIGS. 1 to 3, the decorative eyeglasses frame in accordance with the present invention comprises a front comprising a first part 14 and a second part 10. The first part 14 has a notch 140 defined in two ends thereof and each of the two ends of the first part 14 has an inclined surface 141 which communicates with the notch 140. Two connection blocks 11 are located on a front side of the second part 10 and the two connection blocks 11 are attached at two ends of the second part 10. Each connection block 11 has an inclined top 110 so that the inclined surface 141 in each end of the first part 14 is engaged with the inclined top 110 of the connection block 11.

A lens member 13 has two lens 132 and a bridge member 131 connects the two respective first ends of the two lens 132 together. Each lens 132 has a recess 130 defined in a second end thereof. The bridge member 131 is clamped between the first part 14 and the second part 10 by way of gluing, ultra-sonic welding, heat pressing or the like to let the first part 14, the second part 10 and the bridge member 131 be securely connected with each other. The two connection blocks 11 are respectively engaged with the two recesses 130 of the lens member 13 and the two notches 140 of the first part 14 by way of gluing, ultra-sonic welding, heat pressing or the like.

Two temples 12 each have an ear hook 121 on a first end thereof and a protrusion 120 extends from a second end of each temple 12. The protrusion 120 is adhered on a top of the second part 10.

The front and the two temples 12 are made of foam material so that they are light in weight and can be made to be different shapes and colors. The foam material is stiff enough so that the lens member 13 can be fixedly clamped between the first part 14 and the second part 10. The two temples 12 are foldable toward the front because the two temples 12 are made of foam material. By the decorative eyeglasses frame of the present invention, the lens member 13 can be clamped between the two parts 14, 10 so that it has the same function as the general eyeglasses frame.

Figure 4:
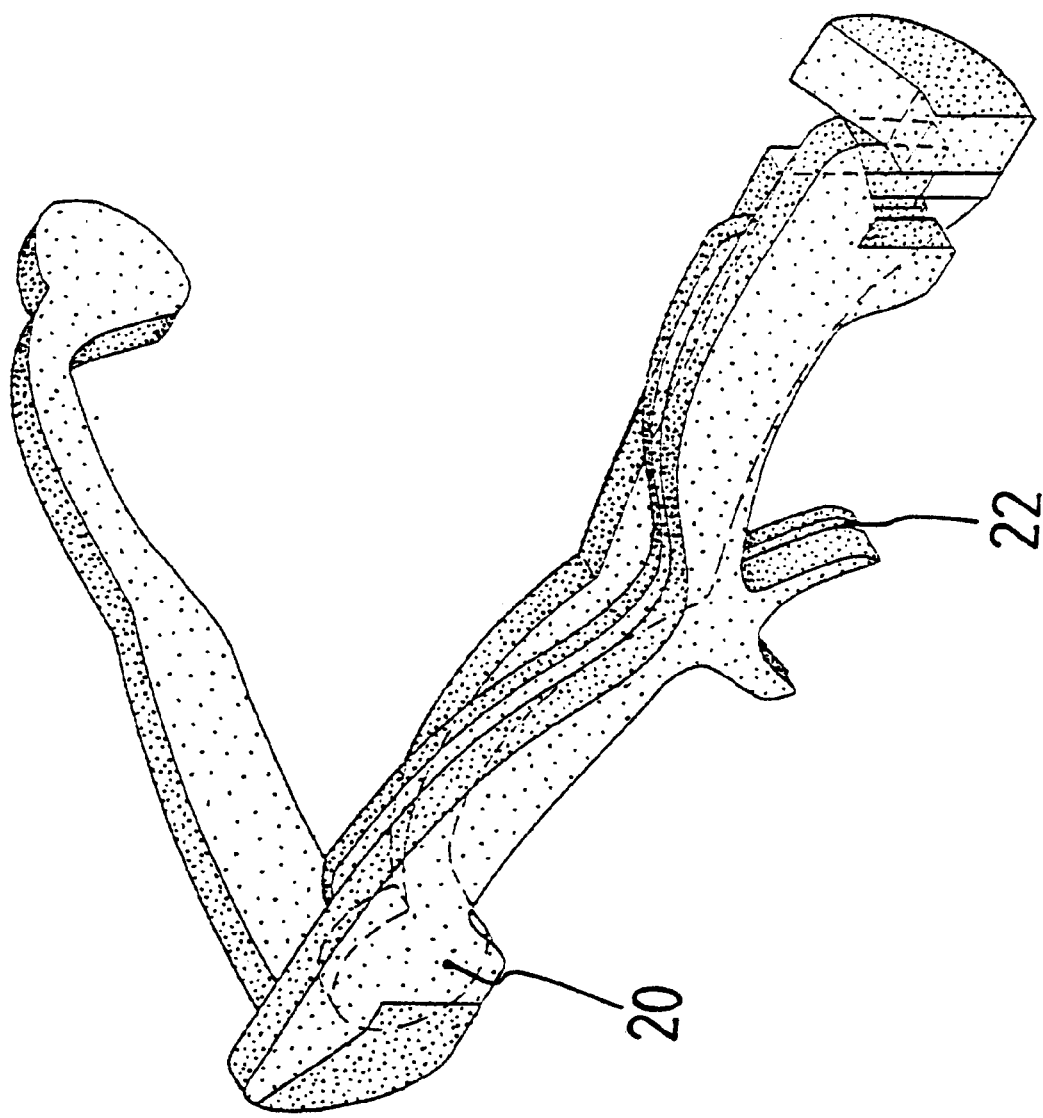
FIG. 4 is a perspective view of another embodiment of the decorative eyeglasses frame in accordance with the present invention, wherein front is made to be one-piece member with slot for receiving the lens member.

FIG. 4 shows another embodiment of the present invention wherein the front 20 composed of the first part and the second part are made to be a one-piece member, and a slot 22 is defined in a lower side of the front so that the lens member (not shown) can be securely inserted into the slot 22 by way of gluing, ultra-sonic welding or the like.

While we have shown and described various embodiments in accordance with the present invention, it should be clear to those skilled in the art that further embodiments may be made without departing from the scope and spirit of the present invention.

What is claimed is:

1. A eyeglasses frame comprising:

a front comprising a first part and a second part, said first part having a notch defined in two ends thereof and two connection blocks located on a side of said second part, said two connection blocks attached at two ends of said second part;

a lens member having two recesses respectively defined in two ends thereof, said lens member clamped between said first part and said second part by way of gluing, said two connection blocks respectively engaged with said two recesses of said lens member and said two notches of said first part by way of gluing, and two temples, each temple having a protrusion extending from a first end thereof, said protrusion adhered on a top of said second part.

2. The eyeglasses frame as claimed in claim 1, wherein each connection block has an inclined top and each of said two ends of said first part has an inclined surface which is engaged with said inclined top of said connection block.

* * * * *